(12) United States Patent
Saito (10) Patent No.: US 8,165,456 B2
(45) Date of Patent: Apr. 24, 2012

(54) DATA CONTROL APPARATUS, DATA BACKUP APPARATUS, AND RECORDING MEDIUM

(75) Inventor: Hiroshi Saito, Osaka (JP)

(73) Assignee: Panasonic Corporation, Osaka (JP)

( * ) Notice: Subject to any disclaimer, the term of this patent is extended or adjusted under 35 U.S.C. 154(b) by 412 days.

(21) Appl. No.: 12/507,408

(22) Filed: Jul. 22, 2009

(65) Prior Publication Data

US 2010/0021127 A1 Jan. 28, 2010

(30) Foreign Application Priority Data

Jul. 23, 2008 (JP) ................................. 2008-189493

(51) Int. Cl.
*G11B 27/00* (2006.01)

(52) U.S. Cl. ........................................ 386/278; 386/281

(58) Field of Classification Search ........................ None
See application file for complete search history.

(56) References Cited

U.S. PATENT DOCUMENTS

2003/0016254 A1* 1/2003 Abe .............................. 345/864
2004/0240845 A1* 12/2004 Hayashi .......................... 386/52

FOREIGN PATENT DOCUMENTS

JP 2001-6274 1/2001

* cited by examiner

*Primary Examiner* — William C Vaughn, Jr.
*Assistant Examiner* — Asher Khan
(74) *Attorney, Agent, or Firm* — Wenderoth, Lind & Ponack, L.L.P.

(57) ABSTRACT

A data control apparatus includes: a separating unit for separating material data included in original video and audio files into a used portion and an unused portion, based on editing information indicating the used portion of the material data in the video and audio files, and generating first data including only the used portion and second data including only the unused portion; a connection information generation unit for generating connection information associating information about positions of the first data and the second data in the original video and audio files with information about positions of the first data and the second data on an external recording medium; and a formatting unit for arranging the first data, the second data, the connection information, and the editing information in a predetermined order, and outputting, as backup data, the first data, the second data, the connection information, and the editing information.

9 Claims, 8 Drawing Sheets

| MATERIAL | EDITING INFORMATION | |
|---|---|---|
| | TIME ON ORIGINAL FILE | TIME ON MAIN PROGRAM DATA |
| MATERIAL DATA a | Ta(1)~Ta(2) | Tc(0)~Tc(1) |
| MATERIAL DATA b | Tb(1)~Tb(2) | Tc(1)~Tc(2) |

TIME →

*Fig.8A*
MATERIAL DATA a

*Fig.8B*
MATERIAL DATA b

*Fig.8C*
MAIN PROGRAM DATA

*Fig.8D PRIOR ART*
CONVENTIONAL BACKUP DATA

DATA CONTROL APPARATUS, DATA BACKUP APPARATUS, AND RECORDING MEDIUM

BACKGROUND OF THE INVENTION

1. Field of the Invention

The present invention relates to a data control apparatus for generating backup data of video and audio data having been edited and a recording medium that stores a program for generating backup data of video and audio data having been edited, and further relates to a data backup apparatus that is provided with the data control apparatus and records the generated backup data in a recording medium.

2. Related Art

Generally, one program is produced by extracting portions to be used from material data having a length several times longer than the data actually used as a main program. At this occasion, it is necessary to perform an operation of selecting only the needed portions from the large amount of video and audio material data and arranging the video data and the audio data in a desired order.

Conventionally, such an operation is achieved by linear editing with a video tape recorder (VTR). For example, only the needed portions of multiple material data are coupled on one video tape by repeating the following operations: copying a needed portion of a certain material data to a video tape; and copying a needed portion of another material data to a position of the video tape immediately subsequent thereto. In this way, the result of the editing (hereinafter referred to as "main program data") is recorded onto one video tape through the linear editing.

Figure 8A:
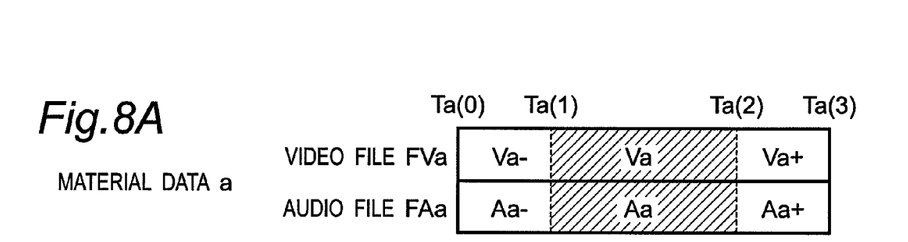
FIGS. 8A and 8B are views illustrating structures of material data.
Figures 8B, 8C:
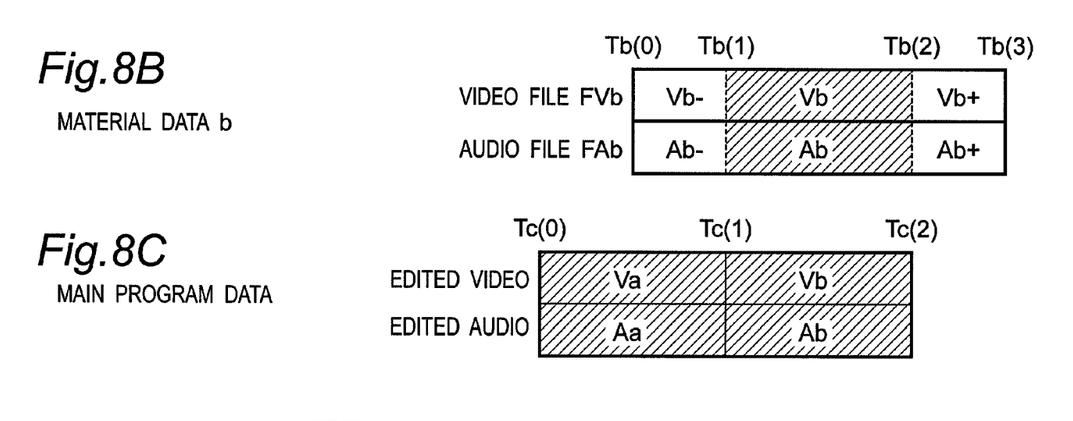
FIG. 8C is a view illustrating structure of main program data.

Recently, along with the advancement of digital technologies, non-linear editing, in which video and audio are edited as digital data with a non-linear editing machine (for example, a computer), is coming into wide use to replace the linear editing conventionally performed. In the non-linear editing, generally, material data "a" and "b" as shown in FIGS. 8A and 8B are stored as data files FVa, FAa, FVb, Fb on a hard disk drive (HDD) of the non-linear editing machine. In the non-linear editing, the extraction of the portions to be used as the main program is performed by generating and rewriting editing information indicating the portions to be used as the main program. Due to the HDD's high performance in random access, it is not necessary to generate and save the main program data as shown in FIG. 8C on a tape and the like. Accordingly, in the case where the main program data is not generated, the main program data is reproduced by reading the needed portions Va, Aa, Vb, Ab of the material data "a" and "b" from the HDD in accordance with the editing information every time a need arises.

Figure 8D:
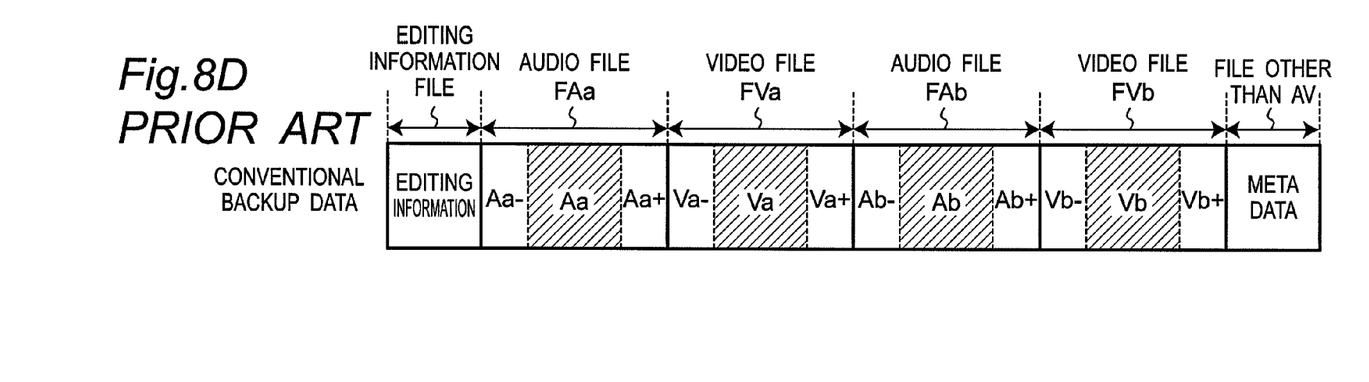
FIG. 8D is a view illustrating structure of conventional backup data.

Because of the limitation on the recording capacity of the HDD, it may be necessary to replace the material data in the HDD when another program is produced. At this time, the material data "a" and "b" and the editing information currently stored in the HDD are moved as backup data as shown in FIG. 8D to an external recording medium such as a backup tape of a computer and the like by a data backup apparatus so that the currently produced program can be reproduced or re-edited later. A conventional data backup apparatus writes the data on the HDD onto an external recording medium in units of files (for example, see JP-A-2001-6274).

The conventional data backup apparatus sequentially writes the data in units of files, and therefore, as shown in FIG. 8D, the used portions Aa, Va, Ab, Vb of the material data stored in the external recording medium are physically placed at positions away from each other on the external recording medium due to the existence of unused portions Aa−, Aa+, Va−, Va+, Ab−, Ab+, Vb−, Vb+. Accordingly, even if the files, such as the audio file FAa, the video file FVa, the audio file FAb, the video file FVb, . . . , are sequentially read out in this order from the external recording medium, the video and audio cannot be synchronously reproduced in the same manner as a video tape for a VTR. Therefore, in order to reproduce the main program data using the backed-up material data, it is necessary to read the entire backed-up data written to the external recording medium to the HDD and generate and reproduce the main program data based on the editing information.

The more the amount of the material data stored in the external recording medium is, the more time it takes to read the backed-up data on the HDD. Therefore, there is a problem in that the operation of reproducing the main program data cannot be easily performed. Further, since the material data is stored in the external recording medium in units of files, it is necessary to load all of the material data including the unused portions into the HDD. Therefore, there is a problem in that when the HDD does not have a sufficiently large free space, the entire material data stored in the external recording medium cannot be read into the HDD, and the main program data cannot be reproduced. In this way, the conventional data backup apparatus has a problem in that, when the program using the backed-up material data is reproduced, a sufficiently large free space is necessary in the HDD of the non-linear editing machine, and it takes a great amount of time to read the data from the external recording medium. Therefore, the synchronous reproduction of the video and audio of the main program data cannot be easily performed.

SUMMARY OF THE INVENTION

The present invention aims to solve the above-described conventional problems, and it is an object of the present invention to provide a data backup apparatus, a data control apparatus, and a recording medium storing a program for easily reproducing the video and audio of the main program data in a synchronized manner. Specifically, it is an object of the present invention to provide the data backup apparatus, the data control apparatus, and the recording medium storing the program that do not require a sufficiently large free space in the HDD of the non-linear editing machine and reduce a time needed to read the data from the external recording medium, when the main program data using the backed-up material data is reproduced. The data backup apparatus includes a recording apparatus for recording backup data onto an external recording medium and a reproduction apparatus for restoring original video and audio files from the backup data recorded on the external recording medium by the recording apparatus and/or for synchronously reproducing the video and audio upon reading the backup data recorded on the external recording medium.

A data control apparatus according to a first aspect of the present invention generates backup data of video and audio data having been edited. The data control apparatus includes: a separation unit operable to input material data included in original video and audio files and editing information indicating a used portion of the material data in the original video and audio files, separate the material data into the used portion and an unused portion based on the editing information, and generate first data including only the used portion and second data including only the unused portion; a connection information generation unit operable to generate connection information associating information about positions of the first data and the second data in the original video and audio files with information about positions of the first data and the second data on an external recording medium when the first data and the second data are recorded onto the external recording medium; a formatting unit operable to arrange the first data, the second data, the connection information, and the editing information in a predetermined order, and output, as backup data, the first data, the second data, the connection information, and the editing information.

The data control apparatus may further include an AV interleave unit operable to break the video and audio data of at least the first data into pieces and alternately interleave the pieces.

In the case where the editing information indicates, in time series, the used portion of the material data in the original video and audio files, the formatting unit may sort the used portion of the material data constituting the first data in accordance with an order indicated by the editing information.

The data control apparatus may not generate the second data when all of the material data is the used portion.

A data control apparatus according to a second aspect of the present invention restores original video and audio files from backup data which is read from an external recording medium. The external recording medium stores the backup data. The backup data includes first data including only a used portion of material data included in the original video and audio files, second data including only an unused portion of the material data, editing information indicating the used portion of the material data in the original video and audio files, and connection information associating information about positions of the first data and the second data in the original video and audio files with information about positions of the first data and the second data on the external recording medium. The data control apparatus includes: a format extraction unit operable to separate the backup data read from the external recording medium into the first data, the second data, the editing information, and the connection information; a connection information decoder unit operable to decode the separated connection information; and a restoring unit operable to restore the original video and audio files by combining the used portion and the unused portion of the material data included in the first data and the second data in accordance with the decoded connection information.

The data control apparatus according to the second aspect of the present invention may further include an AV interleave decoder unit operable to decode a data sequence of the interleaved video and audio data to sort the interleaved video and audio data into data including only video or audio, wherein, in a case where the first data and/or the second data are interleaved, the restoring unit may restore the original video and audio files from the video data and the audio data sorted by the AV interleave decoder unit.

A data control apparatus according to a third aspect of the present invention reproduces video and audio from backup data which is read from an external recording medium. The external recording medium stores the backup data. The backup data includes interleaved first data including only a used portion of material data included in original video and audio files, second data including only an unused portion of the material data, editing information indicating the used portion of the material data in the original video and audio files, and connection information associating information about positions of the first data and the second data in the original video and audio files with information about positions of the first data and the second data on the external recording medium. The data control apparatus includes: a format extraction unit operable to separate the backup data read from the external recording medium into the first data, the second data, the editing information, and the connection information; an AV interleave decoder unit operable to decode a data sequence of the separated first data and sort the first data into data including only video or audio; and a video/audio reproduction unit operable to reproduce and output synchronously the video data and the audio data outputted from the AV interleave decoder unit.

A data backup apparatus according to a first aspect of the present invention includes: the data control apparatus according to the first aspect operable to generate backup data of video and audio data having been edited; and a data recording apparatus operable to record the backup data generated by the data control apparatus according to the first aspect onto the same external recording medium.

A data backup apparatus according to the second aspect of the present invention includes: a data reading apparatus operable to read backup data from an external recording medium; and the data control apparatus according to the second aspect operable to restore original video and audio files from the read backup data.

A data backup apparatus according to the third aspect of the present invention includes: a data reading apparatus operable to read backup data from an external recording medium; and the data control apparatus according to the third aspect operable to reproduce video and audio from the read backup data.

A recording medium according to a first aspect of the present invention stores a program for generating backup data of video and audio data having been edited. The program causes a computer to execute the steps of: inputting material data included in original video and audio files and editing information indicating a used portion of the material data in the original video and audio files, and separating the material data into the used portion and an unused portion based on the editing information to generate first data including only the used portion and second data including only the unused portion; generating connection information associating information about positions of the first data and the second data in the original video and audio files with information about positions of the first data and the second data onto an external recording medium when the first data and the second data are recorded on the external recording medium; arranging the first data, the second data, the connection information, and the editing information in a predetermined order, and outputting, as backup data, the first data, the second data, the connection information, and the editing information.

The program stored in the above-mentioned recording medium may further cause the computer to execute a step of breaking the video and audio data of at least the first data into pieces and alternately interleaving the pieces.

In the above-mentioned recording medium, in the case where the editing information indicates, in time series, the used portion of the material data in the original video and audio files, in the step of outputting the backup data, the used portion of the material data constituting the first data may be sorted in accordance with an order indicated by the editing information.

In the above-mentioned recording medium, the second data may not be generated when all of the material data is the used portion.

A recording medium according to a second aspect of the present invention stores a program for restoring original video and audio files from backup data read from an external recording medium. The external recording medium stores the backup data. The backup data includes first data including only a used portion of material data included in the original video and audio files, second data including only an unused portion of the material data, editing information indicating the used portion of the material data in the original video and audio files, and connection information associating information about positions of the first data and the second data in the original video and audio files with information about positions of the first data and the second data on the external recording medium. The program causes a computer to execute the steps of: separating the backup data read from the external recording medium into the first data, the second data, the editing information, and the connection information; decoding the separated connection information; and restoring the original video and audio files by combining the used portion and the unused portion of the material data included in the first data and the second data in accordance with the decoded connection information.

The program stored in the recording medium according to the second aspect of the present invention may further cause the computer to execute the steps of: decoding a data sequence of the interleaved video and audio data to sort the interleaved video and audio data into data including only video or audio, wherein in a case where the first data and/or the second data are interleaved, the original video and audio files are restored based on the video data and the audio data sorted into the data including only video or audio.

A recording medium according to a third aspect of the present invention stores a program for reproducing video and audio from backup data read from an external recording medium. The external recording medium stores the backup data. The backup data includes an interleaved first data including only a used portion of material data included in original video and audio files, second data including only an unused portion of the material data, editing information indicating the used portion of the material data in the original video and audio files, and connection information associating information about positions of the first data and the second data in the original video and audio files with information about positions of the first data and the second data on the external recording medium. The program causes a computer to execute the steps of: separating the backup data read from the external recording medium into the first data, the second data, the editing information, and the connection information; decoding a data sequence of the separated first data to sort the first data into data including only video or audio; and reproducing and outputting synchronously the video data and the audio data having been sorted.

According to the present invention, the used portions and the unused portions of the material data included in the video and audio files are separated based on the editing information indicating the used portions, and the used data including only the used portions is recorded onto the external recording medium, and therefore, the main program data using the material data backed-up by the data backup apparatus can be generated and reproduced by reading only the used data. Therefore, a sufficiently large free space is not needed in the HDD of the non-linear editing machine, and it takes less time to read the data from the external recording medium. Accordingly, the synchronous reproduction of the video and audio of the main program data can be performed easily.

Further, according to the present invention, not only the used data but also the unused data including only the unused portions are recorded onto the external recording medium. Further, connection information associating information about positions of both of the used data and the unused data of the material data in the original video and audio files with information about positions of both of the used data and the unused data of the material data on the external recording medium is generated, and the generated connection information is recorded onto the external recording medium. Therefore, the original video and audio files can be restored by reading the used data, the unused data, and the connection information from the external recording medium.

DETAILED DESCRIPTION OF THE PREFERRED EMBODIMENTS

Embodiments of the present invention will be described with reference to the drawings.

First Embodiment

1. Configuration 1.1 Configuration of Data Backup Apparatus

Figure 1:
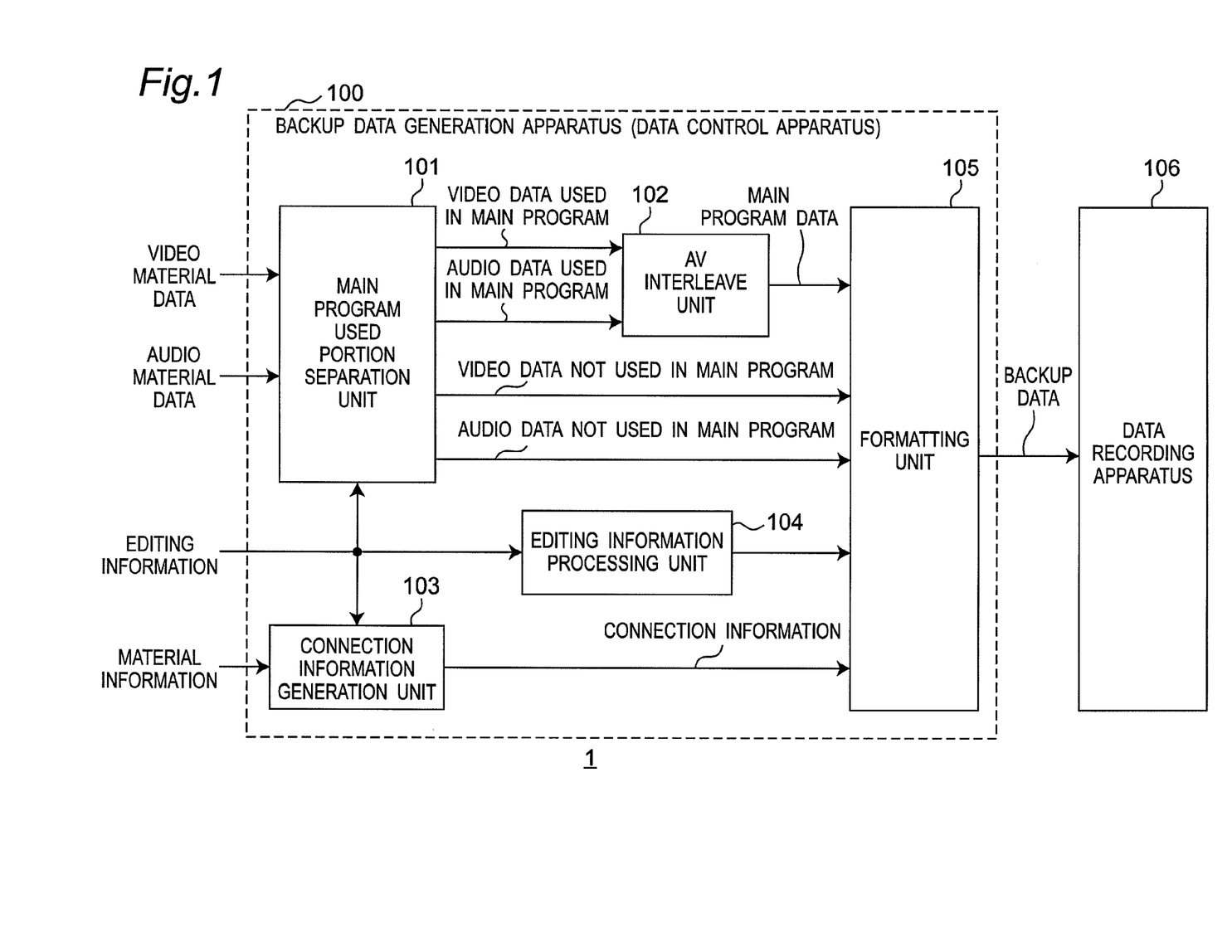
FIG. 1 is a view illustrating a configuration of a data backup apparatus according to a first embodiment of the present invention.

FIG. 1 illustrates a data backup apparatus according to a first embodiment of the present invention. A data backup apparatus 1 according to the present embodiment is a recording apparatus that reads material data which is video and/or audio data, and backs up the read material data to an external recording medium. The data backup apparatus 1 is used by being connected to a non-linear editing machine (for example, a computer) that edits a program and the like. In the present embodiment, a backup tape of a computer is used as the external recording medium.

The data backup apparatus 1 according to the present embodiment includes a backup data generation apparatus (data control apparatus) 100 for generating backup data of video and audio data having been edited, a data recording apparatus (for example, a tape drive) 106 for recording the generated backup data onto the external recording medium. The backup data generation apparatus 100 includes: a main program used portion separation unit (hereinafter referred to as "separation unit") 101 and an AV interleave unit 102 for handling the material data; a connection information generation unit 103 and an editing information processing unit 104 for handling information relating to the material data; and a formatting unit 105 for formatting and outputting data for backup.

The separation unit 101 inputs the material data, that is, the video and audio data, included in the video and audio files and the editing information indicating the used portions of the material data to be used as the main program, and the separation unit 101 separates the input material data into the used portions and the unused portions in accordance with the editing information. The used portions of the separated data are outputted to the AV interleave unit 102, and the unused portions of the separated data are outputted to the formatting unit 105. The AV interleave unit 102 breaks, into pieces, the video and audio data in the used portions of the material data, interleaves the pieces of the video and audio data, and outputs the interleaved video and audio data as the main program data to the formatting unit 105.

The editing information processing unit 104 inputs the editing information indicating the used portions of the material data to be used as the main program, changes the format of the inputted editing information into a predetermined format, and outputs the changed editing information to the formatting unit 105. The connection information generation unit 103 inputs the editing information and material information indicating the positions of the material data in the video and audio files, generates the connection information for enabling the restoring of the original video and audio files from the backup data recorded on the backup tape, and outputs the generated connection information to the formatting unit 105.

The formatting unit 105 receives the main program data, the unused data, the editing information, and the connection information, arranges them in a predetermined order, and outputs them as the backup data to the data recording apparatus 106. At this time, the main program data is sorted in the order according to the editing information. The data recording apparatus 106 records the received backup data onto a backup tape.

1.2 Structure of Various Data and Information

The material data (the main program data and the unused data), the editing information, and the connection information included in the backup data will be hereinafter described.

Figure 2A:
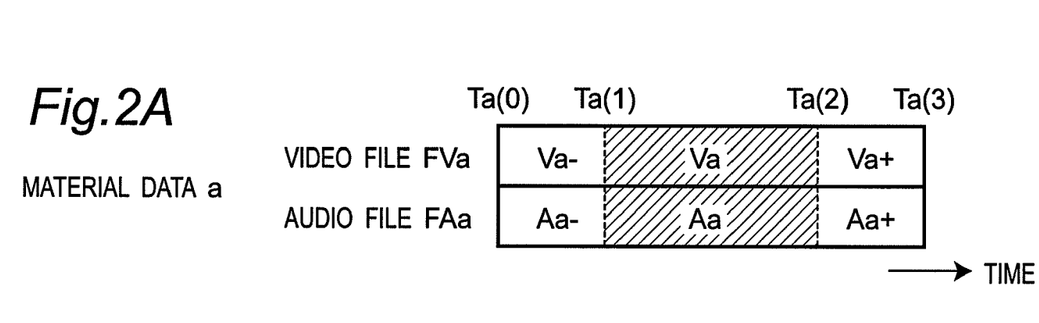
FIGS. 2A and 2B are views each illustrating a structure of material data.
Figure 2B:
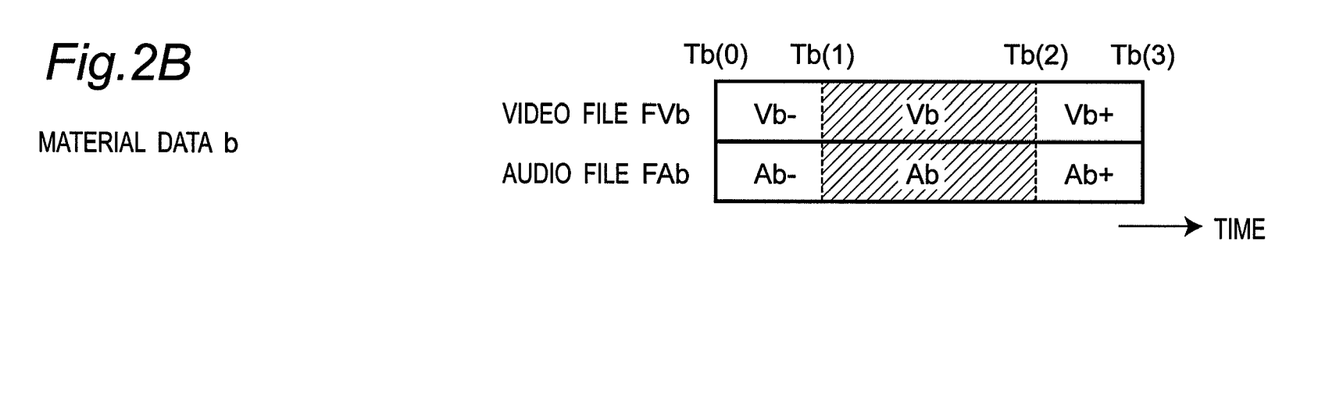

FIGS. 2A and 2B illustrate the material data to be backed up. FIG. 2A illustrates material data "aa", and FIG. 2B illustrates material data "b". The material data "a" is video and audio data included in a video file FVa and an audio file FAa. As described later, in the present embodiment, data Va and Aa from time Ta(1) to time Ta(2) in the video file FVa and the audio file FAa are the portions used in the main program, and data Va− aid Aa− from time Ta(0) to the time Ta(1) and data Va+ and Aa+ from the time Ta(2) to time Ta(3) are the portions not used in the main program. The material data "b" is the video and audio data included in a video file FVb and an audio file FAb. Data Vb and Ab from time Tb(1) to time Tb(2) in the video file FVb and the audio file FAb are the used portions, and data Vb− and Ab− from time Tb(0) to the time Tb(1) and data Vb+ and Ab+ from the time Tb(2) to time Tb(3) are the unused portions.

Figure 3:
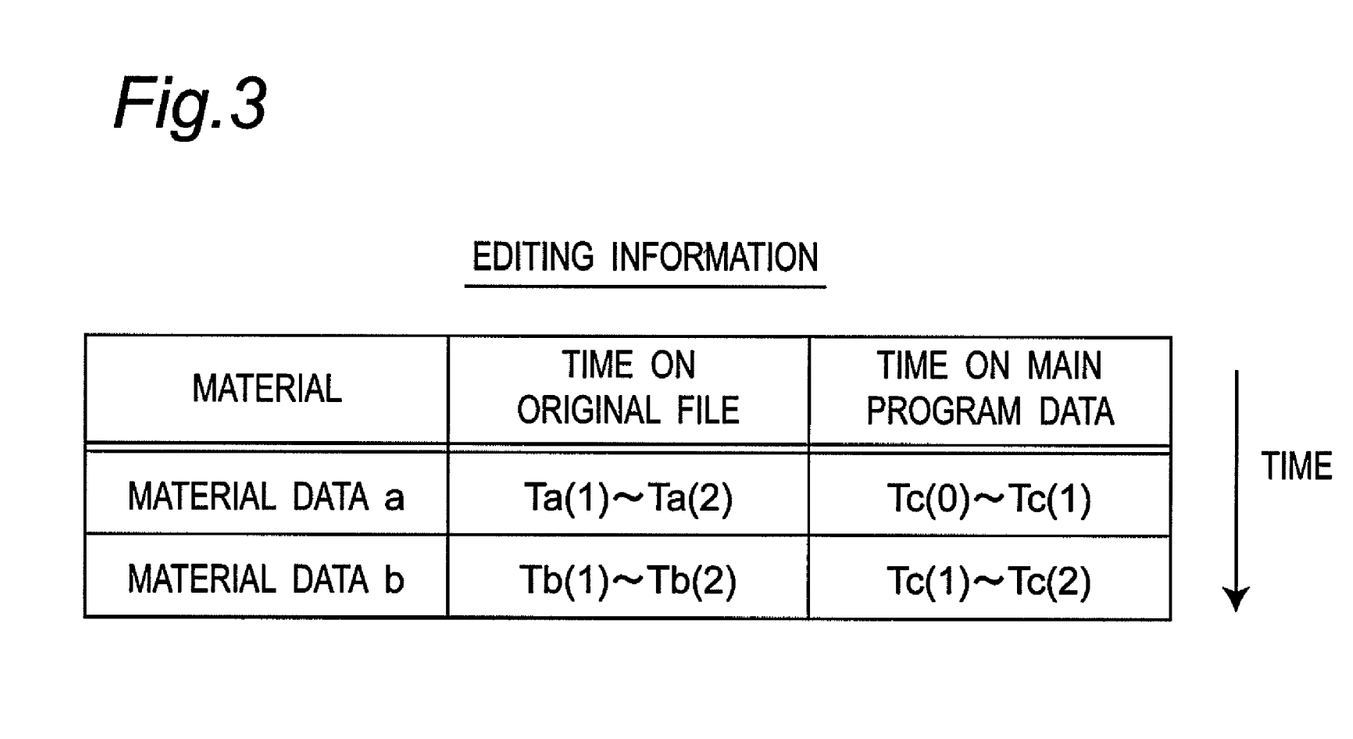
FIG. 3 is a view illustrating a structure of editing information.

FIG. 3 illustrates the editing information inputted to the data backup apparatus 1. The editing information includes, in time series, the times on the original file and the times on the main program data being a result of editing, of the portions of the material data "a" and "b" which are used in the main program. For example, FIG. 3 illustrates that the data from the time Ta(1) to Ta(2) on the original file of the material data "a" corresponds to the data from the time Tc(0) to Tc(1) on the main program data, and the data from the time Tb(1) to Tb(2) on the original file of the material data "b" corresponds to the data from the times Tc(1) to Tc(2) on the main program. It is understood from FIG. 3 that the main program data is generated by combining, in time series, the data corresponding to the material data "aa" from the time Ta(1) to the time Ta(2) and the data corresponding to the material data "b" from the time Tb(1) to the time Tb(2). That is, the editing information indicates a connection relationship between the multiple material data "a" and "b" regarding the portions to be used as the main program. Accordingly, the main program data is generated by connecting the material data "a" and the material data "b" through cut editing.

Figure 4A:
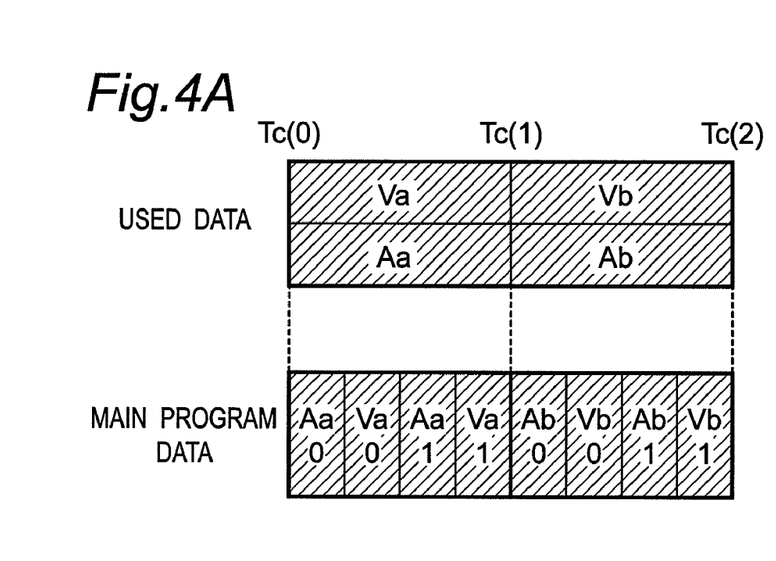
FIG. 4A is a view illustrating used data and FIG. 4B is a view illustrating unused data.
Figure 4B:
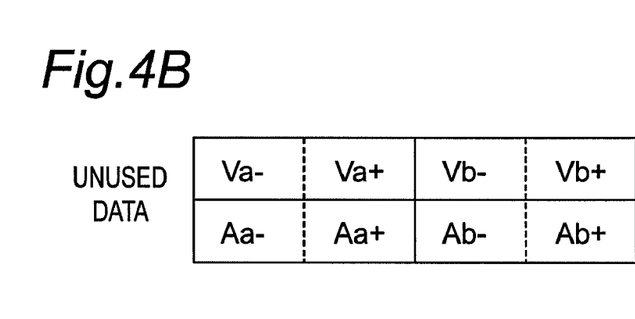

FIG. 4A illustrates the used data including the used portions of the material data separated in accordance with the editing information, and FIG. 4B illustrates the unused data including the unused portions of the material data. The used data separated in accordance with the editing information includes the used portions Va, Aa, Vb, Ab of the material data. The main program data is made by further breaking the used data into pieces and alternately placing the audio data and the video data. The unused data separated in accordance with the editing information includes the unused portions Va−, Aa−, Va+, Aa+, Vb−, Ab−, Vb+, Ab+ of the material data.

Figure 5:
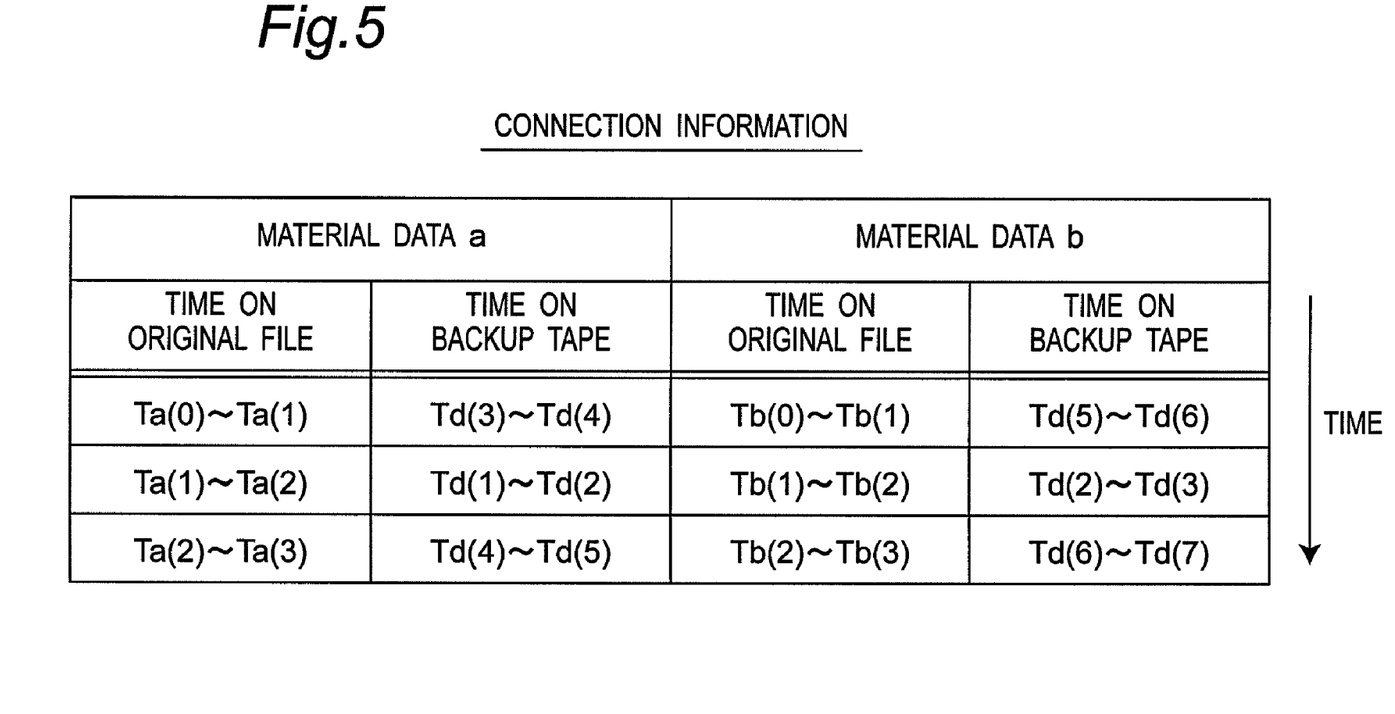
FIG. 5 is an example showing a structure of connection information.

FIG. 5 illustrates the connection information generated by the connection information generation unit 103. The connection information shows that the data at which position on the backup tape should be connected in what order in order to restore the original video and audio files. In other words, the connection information shows the connection relationship between the used portions and the unused portions of each of the material data "a" and "b". Specifically, the connection information uses the times Ta and Tb of the material data and the time Td on the backup tape to indicate a correspondence relationship between the information about positions of the material data "a" and "b" in the original video and audio files and the information about positions of the material data "a" and "b" on the backup tape. FIG. 5 shows that, regarding the material data a, the data in the times Ta(0) to Ta(1), Ta(1) to Ta(2), and Ta(2) to Ta(3) on the original audio and video files respectively correspond to the data in the times Td(3) to Td(4), Td (1) to Td(2), and Td(4) to Td(5) on the backup tape. In other words, it is understood that the original video and audio files of the material data "a" can be restored by connecting the data in the times Td(3) to Td(4), Td (1) to Td(2), and Td(4) to Td(5) on the backup tape in this order. Further, FIG. 5 shows that, regarding the material data b, the data in the times Tb(0) to Tb(1), Tb(1) to Tb(2), and Th(2) to Tb(3) on the original audio and video files respectively correspond to the data in the times Td(5) to Td(6), Td (2) to Td(3), and Td(6) to Td(7) on the backup tape. It is understood that the original video and audio files of the material data "b" can also be restored by connecting the data in the times Td(5) to Td(6), Td (2) to Td(3), and Td(6) to Td(7) on the backup tape in this order.

Figure 6:
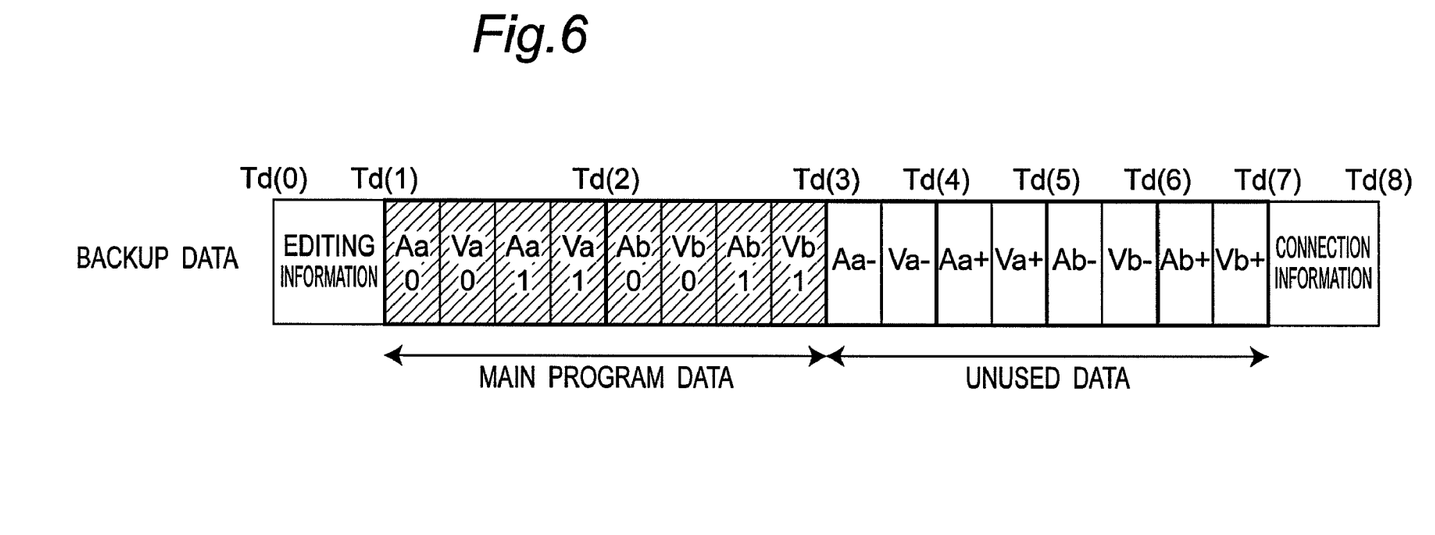
FIG. 6 is a view illustrating a structure of backup data.

FIG. 6 illustrates the backup data. The backup data includes the editing information shown in FIG. 3, the main program data shown in FIG. 4A, the unused data shown in FIG. 4B, and the connection information shown in FIG. 5 in this order.

2. Recording Operation of Data Backup Apparatus

The recording operation of the data backup apparatus 1 according to the present embodiment will be described with reference to FIGS. 1 to 6, using an example where the material data "a" and the material data "b" are backed up. When the backup tape is loaded to the data backup apparatus 1 and the user inputs an instruction to back up the data to the data backup apparatus 1, the separation unit 101 reads, from the HDD of the non-linear editing machine, the material data "a" included in the video file FVa and the audio file FAa shown in FIG. 2A, the material data "b" included in the video file FVb and the audio file FAb shown in FIG. 2B, and the editing information shown in FIG. 3.

The separation unit 101 separates the material data "a" and the material data "b" into the used data including only the used portions and the unused data including only the unused portions in accordance with the read editing information. Specifically, the separation unit 101 generates the used data by extracting the data Va and Aa corresponding to the times Ta(1) to Ta(2) on the files of the material data "a" and the data Vb and Ab in the times Tb(1) to Tb(2) on the files of the material data "b" as described in the editing information, and generates the unused data by gathering the remaining data. The used data is outputted to the AV interleave unit 102, and the unused data is outputted to the formatting unit 105.

The AV interleave unit 102 breaks the used data into pieces, and generates the main program data by alternately arranging the broken data, as shown in FIG. 4A. For example, the video data Va is separated into data Va0 and Va1, the audio data Aa is separated into data Aa0 and Aa1. The data thus separated are arranged into the order, Aa0, Va0, Aa1, Va1, in which the audio data and the video data are alternately placed. The maximum recording efficiency and maximum reproduction efficiency can be obtained by conforming the data size upon breaking the data to a data management unit (e.g., sector or cluster) of the backup medium. The main program data is outputted to the formatting unit 105.

The editing information inputted to the data backup apparatus 1 is converted into a format of the backup tape by the editing information processing unit 104. For example, the editing information processing unit 104 converts the editing information from a format of the non-linear editing machine (for example, file format) into a format of a backup tape of a computer.

The connection information generation unit 103 inputs the editing information and the material information indicating the positions of the material data "a" and "b" in the video and audio files, and generates the connection information, as shown in FIG. 5, for associating the positions of the material data "a" and "b" on the video and audio files with the positions of the material data "a" and "b" on the backup tape upon recording the material data "a" and "b" onto the backup tape.

The formatting unit 105 receives the main program data, the unused data, the editing information, and the connection information, and arranges them into the following order: the editing information, the main program data, the unused data, and the connection information. The main program data is arranged in accordance with the editing information so that the data Aa0, Va0, Aa1, Va1 of the material data "a" reproduced first are arranged first and the data Ab0, Vb0, Ab1, Vb1 of the material data "b" are subsequently arranged. The formatting unit 105 converts the format of the main program data, the unused data, the editing information, and the connection information into a desired format (for example LTO-3), and outputs the formatted data as the backup data as shown in FIG. 6.

The data recording apparatus 106 records the backup data outputted from the formatting unit 105 onto the backup tape.

3. Summary

The data backup apparatus 1 according to the present embodiment separates the used portions and the unused portions of the material data "a" and "b" in accordance with the editing information, and generates the used data including only the used portions. Further, the data backup apparatus 1 according to the present embodiment interleaves the used data to generate the main program data, and records the main program data onto the backup tape. Therefore, when the main program data is reproduced, the main program data can be synchronously-reproduced directly from the backup tape, just like a video tape recorded through the linear editing such as VTR. In other words, it is not necessary to load both of the editing information and the used data to the HDD of the non-linear editing machine in order to generate and reproduce the main program data based on the editing information. Therefore, the synchronous reproduction of the video and audio of the main program data can be easily performed. When the main program data recorded on the backup tape is reproduced, it is not necessary for the HDD of the non-linear editing machine to have any free space, and it takes less time to read the data from the external recording medium.

Further, in the present embodiment, not only the main program data but also the unused data and the connection information are stored in the backup tape. Accordingly, the entire original material data "a" and "b" can be completely restored in units of files on the HDD of the non-linear editing machine, by reading the main program data, the unused data, and the connection information recorded on the backup tape and sorting the used portions and the unused portions of the material data recorded on the backup tape based on the connection information. Therefore, the main program data can be re-edited, if the backup tape recorded by the backup apparatus according to the present embodiment is used.

As described above, if the backup data is recorded according to the present embodiment, not only the complete backup of the material data but also the synchronous reproduction of video and audio of the main program can be achieved. This achieves substantial laborsaving in the editing operation because of the operability like the VTR and the reliability of the backup.

In the present embodiment, the backup data is recorded onto the backup tape in the following order: the editing information, the main program data, the unused data, and the connection information, but the present embodiment is not limited to this recording order. It is to be noted that the main program data is preferably recorded to a position corresponding to an earlier time on the backup tape.

The main program data may be recorded onto the backup tape without interleaving. In this case, the reproduction of the main program data can be performed by simply loading only the used data to the HDD of the non-linear editing machine and performing the interleaving processing only on the used data. Accordingly, the main program data can be generated and reproduced. In contrast to the conventional apparatus, it is not necessary to read all the data including the unused data stored in the backup tape, and the main program data can be reproduced in a shorter time. Even if the free space on the HDD of the non-linear editing machine is small, the data needed for the reproduction can be read in because only the used data is read.

The structures of the editing information processed by the data backup apparatus 1 and the connection information generated by the data backup apparatus 1 are not limited to the present embodiment. Similar data structures achieving the same effect may be employed.

Second Embodiment

1. Configuration of Data Backup Apparatus

Figure 7:
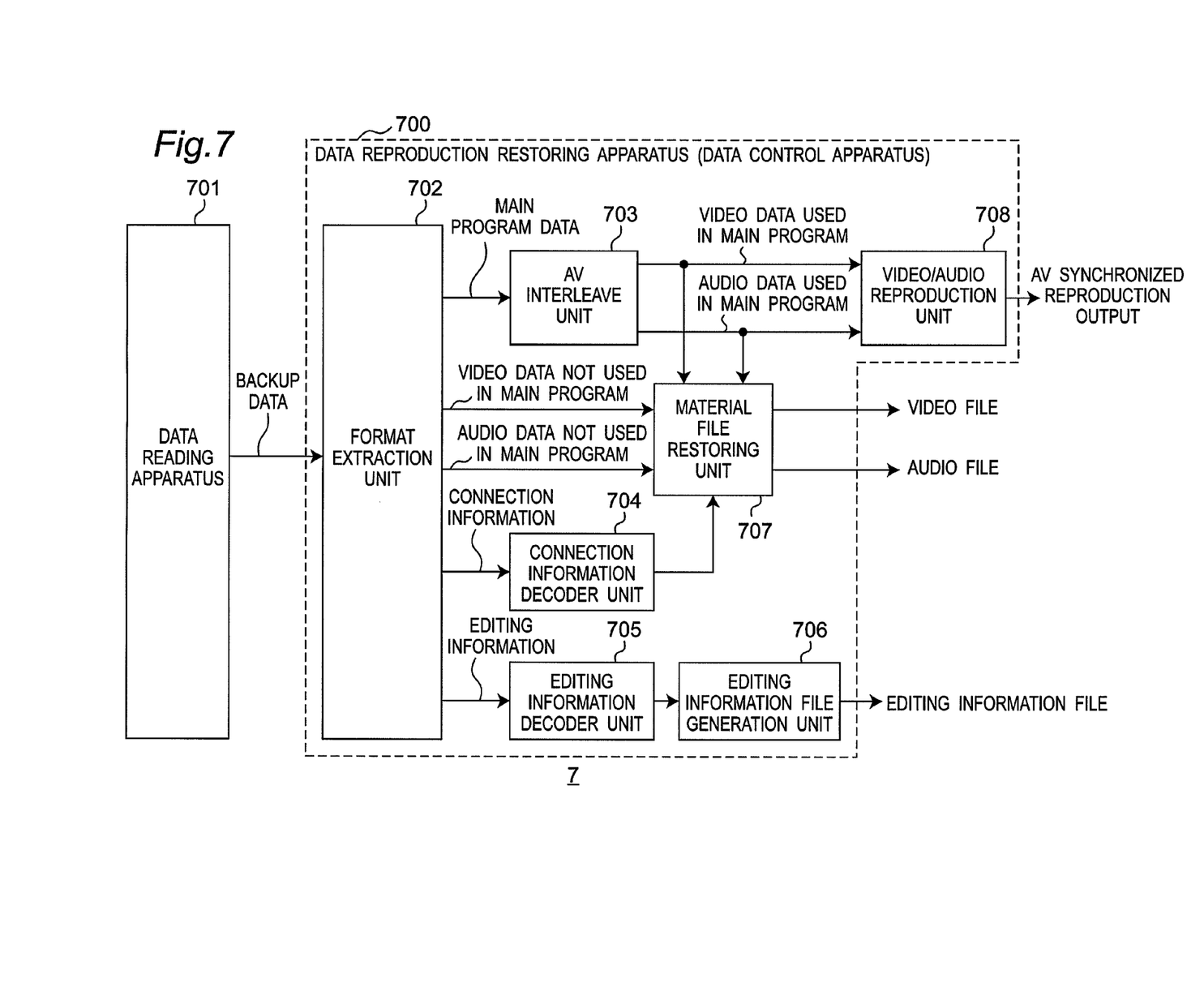
FIG. 7 is a view illustrating a configuration of a data backup apparatus according to a second embodiment of the present invention.

FIG. 7 illustrates a configuration of a data backup apparatus according to a second embodiment of the present invention. A data backup apparatus 7 according to the present embodiment is a reproduction apparatus that reads backup data recorded on an external recording medium and synchronously reproduces the video and audio as well as restoring the original video and audio files. The data backup apparatus 7 is used by being connected to a non-linear editing machine (for example, a computer) that edits a program and the like. In the present embodiment, a backup tape of a computer is used as the external recording medium.

The data backup apparatus 7 according to the present embodiment includes a data reading apparatus (for example, a tape drive) 701 for reading backup data recorded on a backup tape and a data reproduction/restoring apparatus (data control apparatus) 700 for both of synchronously reproducing the video and audio and restoring the original video and audio files from the read backup data. The data reproduction/restoring apparatus 700 includes: a format extraction unit 702 for inputting the data read from the backup tape by the data reading apparatus 701 and extracting the order of the data; an AV interleave decoder unit 703 and a video/audio reproduction unit 708 for synchronously reproducing video and audio; a connection information decoder unit 704 and a material file restoring unit 707 for restoring the original video and audio files; and an editing information decoder unit 705 and an editing information file generation unit 706 for generating an editing information file.

The data reading apparatus 701 reads the backup data from the backup tape. The format extraction unit 702 inputs the read backup data, extracts the format of the backup data, and separates the backup data into the main program data, the unused data, the connection information, and the editing information. The AV interleave decoder unit 703 decodes data sequences of the interleaved video and audio data, and separates the data into video-only data and audio-only data. The video/audio reproduction unit 708 synchronously reproduces the video and audio by connecting, in time-series, the video-only data and the audio-only data.

The connection information decoder unit 704 decodes the connection information separated by the format extraction unit 702. In other words, the connection information decoder unit 704 interprets the meaning of the connection information. The material file restoring unit 707 combines the used data outputted from the AV interleave decoder unit 703 with the unused data outputted from the format extraction unit 702 based on the decoded connection information to restore the original video and audio files.

The editing information decoder unit 705 decodes the editing information separated by the format extraction unit 702. In other words, the editing information decoder unit 705 interprets the meaning of the editing information. The editing information file generation unit 706 generates the editing information file by converting the decoded editing information into a predetermined format.

2. Reproduction Operation of Data Backup Apparatus

The reproduction operation of the data backup apparatus 7 will be described using an example where the backup data shown in FIG. 6 is reproduced. The reproduction operation includes an operation of synchronously reproducing the video and audio after reading the backup data recorded on the external recording medium and an operation of restoring the original video and audio files after reading the backup data recorded on the external recording medium.

First, a case where the video and audio are synchronously reproduced will be described. When the backup tape is loaded to the data backup apparatus 7 and the user inputs an instruction to synchronously reproduce the video and audio to the data backup apparatus 7, the data reading apparatus 701 reads the backup data recorded on the backup tape. In this case, the data reading apparatus 701 reads at least portions including the main program data. For example, the data reading apparatus 701 starts reading from an initial portion of the backup tape shown in FIG. 6. The format extraction unit 702 extracts the main program data from the read backup data and outputs the main program data. For example, the format extraction unit 702 divides the data read sequentially from the initial portion into the editing information and the main program data.

The main program data divided by the format extraction unit 702 is outputted to the AV interleave decoder unit 703. The video and audio of the main program data are each broken into pieces and interleaved alternately. The AV interleave decoder unit 703 decodes the data sequences of the main program data, and sorts the main program data into the video-only data Va and Vb and the audio-only data Aa and Ab. The video/audio reproduction unit 708 reproduces and outputs the sorted video and audio data in a synchronized manner. As a result, the content of the main program data can be seen on a monitor TV and the like.

Next, a case where the original video and audio files are restored will be described. When the backup tape is loaded to the data backup apparatus 7 and the user inputs an instruction to restore the video and audio files to the data backup apparatus 7, the data reading apparatus 701 reads all of the backup data recorded on the backup tape. The format extraction unit 702 extracts the order of the read backup data, and divides the backup data into the main program data, the unused data, the connection information, and the editing information.

The AV interleave decoder unit 703 sorts the main program data, divided by the format extraction unit 702, into the video-only data Va and Vb and the audio-only data Aa and Ab.

The connection information decoder unit 704 decodes the connection information divided by the format extraction unit 702. The material file restoring unit 707 reads the unused video data Va− and Va+ and the unused audio data Aa− and Aa+ divided by the format extraction unit 702, the used video data Va and Vb and the used audio data Aa and Ab outputted from the AV interleave decoder unit 703, and the connection information decoded by the connection information decoder unit 704. The material file restoring unit 707 combines the used video data and the unused video data and combines the used audio data and the unused audio data, in accordance with the decoded connection information, and restores the original video files FVa and FVb and the original audio files FAa and FAb of the material data "a" and "b", respectively. Specifically, each of the video file FVa and the audio file FAa of the material data "a" is restored by combining, in accordance with the connection information, the data at positions corresponding to times Td(3) to Td(4), Td(1) to Td(2), and Td(4) to Td(5) in this order. Further, the video file FVb and the audio file FAb of the material data "b" are restored by combining, in accordance with the connection information, the data at positions corresponding to times Td(5) to Td(5), Td(2) to Td(3), and Td(6) to Td(7) in this order. The restored video and audio files are stored in the HDD of the non-linear editing machine. Therefore, the main program data can be re-edited.

The editing information decoder unit 705 decodes the editing information divided by the format extraction unit 702. The editing information file generation unit 706 generates, from the decoded editing information, the editing information file in a format according to the non-linear editing machine. The generated editing information file is stored to the HDD of the non-linear editing machine. In a case where, e.g., an editing point (boundary line) between a used portion and an unused portion is changed, such re-editing is performed by rewriting the editing information file stored in the HDD.

3. Summary

The backup tape read by the backup apparatus according to the present embodiment includes the interleaved main program data, and therefore, the video and audio of the main program data can be synchronously reproduced and outputted directly from the backup tape, without loading the main program data to the HDD. Therefore, the content of the main program data can be seen easily.

Not only the main program data (the used data) but also the unused data and the connection information are stored in the backup tape read by the backup apparatus according to the present embodiment. Therefore, the original video and audio files can be completely restored by sorting the used data and the unused data based on the connection information. Further, the editing information file can be generated from the editing information recorded on the backup tape. Therefore, the main program data can be re-edited by returning the generated editing information file and the restored video and audio files back to the HDD of the non-linear editing machine.

In the first and second embodiments, the external recording medium is, as an example, the backup tape of a computer, but the external recording medium is not limited to the tape. Any medium can be used as long as it can be used for backup. Especially, the effect of the present invention is exhibited in a case where the data is read out one-dimensionally, such as a tape and a network communication.

In the first and second embodiments, not only the used data including the used portions of the material data but also the unused data including the unused portions may be interleaved.

The data backup apparatus 7 serving as the reproduction apparatus may have only one of the function of synchronously reproducing the video and audio and the function of restoring the material file.

The data backup apparatuses 1 and 7 are described as the recording apparatus in the first embodiment and is described as the reproduction apparatus in the second embodiment, but one data backup apparatus may have both of the functions of the recording apparatus according to the first embodiment and the reproduction apparatus according to the second embodiment.

Further, in the first embodiment and the second embodiment, the data backup apparatuses 1 and 7 are arranged separately from the non-linear editing machine, but the data backup apparatus may be incorporated into the non-linear editing machine.

In the first embodiment and the second embodiment, a case where there are unused portions in the material data (that is, a case where there is unused data including the unused portions) has been described, but the present invention can be applied to a case where there is no unused data (that is, all of the material data is used as the main program). In this case, the backup data generated by the data backup apparatus 1 as shown in FIG. 6 does not include the unused data. It is to be noted that, in this case, it is not necessary for the backup data to include the connection information, or the backup data may include the connection information indicating that there is no unused portion of the material data. In a case where the original video and audio files are restored from the backup data, the material file restoring unit 707 of the data backup apparatus 7 according to the second embodiment can restore the video and audio files by combining, in time series, the used audio data and the used video data outputted from the AV interleave decoder unit 703. At this time, the material file restoring unit 707 determines that there is no unused portion in the material data, based on the fact that there is no unused data in the backup data, the fact that the connection information is not included in the backup data, or the fact that the connection information included in the backup data indicates that there is no unused portion in the material data, and the material file restoring unit 707 may restore the video and audio files from only the used video data and the used audio data.

The functions (operations) of the backup data generation apparatus (data control apparatus) 100 according to the first embodiment and the data reproduction/restoring apparatus (data control apparatus) 700 according to the second embodiment can be achieved by causing a computer to execute a predetermined program.

The data backup apparatus according to the present invention achieves an effect of being able to easily reproduce the video and audio of the main program data in a synchronized manner, and is useful for not only an apparatus for backing up the material data but also an apparatus for recording the main program data.

Although the present invention has been described in connection with specified embodiments thereof, many other modifications, corrections and applications are apparent to those skilled in the art. Therefore, the present invention is not limited by the disclosure provided herein but limited only to the scope of the appended claims. The present disclosure relates to subject matter contained in Japanese Patent Application No. 2008-189493, filed on Jul. 23, 2008, which is expressly incorporated herein by reference in its entirety.

What is claimed is:

1. A data control apparatus that generates backup data of video and audio data having been edited, the data control apparatus comprising:
   a separation unit operable to input material data included in original video and audio files and editing information indicating a used portion of the material data in the original video and audio files, separate the material data into the used portion and an unused portion based on the editing information, and generate first data including only the used portion and second data including only the unused portion;
   a connection information generation unit operable to generate connection information associating information about positions of the first data and the second data in the original video and audio files with information about positions of the first data and the second data on an external recording medium when the first data and the second data are recorded to the external recording medium;
   a formatting unit operable to arrange the first data, the second data, the connection information, and the editing information in a predetermined order, and output, as backup data, the first data, the second data, the connection information, and the editing information.

2. The data control apparatus according to claim 1 further comprising an AV interleave unit operable to break the video and audio data of at least the first data into pieces and alternately interleave the pieces.

3. The data control apparatus according to claim 1, wherein the editing information indicates, in time series, the used portion of the material data in the original video and audio files, and
   wherein the formatting unit sorts the used portion of the material data constituting the first data in accordance with an order indicated by the editing information.

4. The data control apparatus according to claim 1, wherein the second data is not generated when all of the material data is the used portion.

5. A data backup apparatus comprising:
   the data control apparatus according to claim 1 operable to generate backup data of video and audio data having been edited; and a data recording apparatus operable to record the backup data generated by the data control apparatus onto the same external recording medium.

6. A non-transitory recording medium that stores a program for generating backup data of video and audio data having been edited, the program causing a computer to execute the steps of:

inputting material data included in original video and audio files and editing information indicating a used portion of the material data in the original video and audio files, and separating the material data into the used portion and an unused portion based on the editing information to generate first data including only the used portion and second data including only the unused portion;

generating connection information associating information about positions of the first data and the second data in the original video and audio files with information about positions of the first data and the second data on an external recording medium when the first data and the second data are recorded onto the external recording medium;

arranging the first data, the second data, the connection information, and the editing information in a predetermined order, and outputting, as backup data, the first data, the second data, the connection information, and the editing information.

7. The non-transitory recording medium according to claim 6, wherein the program causes the computer to execute the further step of breaking the video and audio data of at least the first data into pieces and alternately interleaving the pieces.

8. The non-transitory recording medium according to claim 6, wherein the editing information indicates, in time series, the used portion of the material data in the original video and audio files, and wherein, in the step of outputting the backup data, the used portion of the material data constituting the first data is sorted in accordance with an order indicated by the editing information.

9. The non-transitory recording medium according to claim 6, wherein the second data is not generated when all of the material data is the used portion.

* * * * *